United States Patent
Kim

(10) Patent No.: US 10,216,303 B2
(45) Date of Patent: Feb. 26, 2019

(54) TOUCH SCREEN AND DISPLAY DEVICE INCLUDING THE SAME

(71) Applicant: Samsung Display Co., Ltd, Yongin-si, Gyeonggi-do (KR)

(72) Inventor: Dae Won Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/438,361

(22) Filed: Feb. 21, 2017

(65) Prior Publication Data

US 2017/0249039 A1 Aug. 31, 2017

(30) Foreign Application Priority Data

Feb. 29, 2016 (KR) ......................... 10-2016-0024370

(51) Int. Cl.
*G06F 3/047* (2006.01)
*G06F 3/044* (2006.01)
*G06F 3/041* (2006.01)

(52) U.S. Cl.
CPC ............ *G06F 3/0412* (2013.01); *G06F 3/044* (2013.01); *G06F 3/047* (2013.01); *G06F 3/0418* (2013.01); *G06F 2203/04111* (2013.01)

(58) Field of Classification Search
CPC ........ G06F 3/0412; G06F 3/047; G06F 3/044; G06F 3/0418; G06F 2203/04111
See application file for complete search history.

(56) References Cited

U.S. PATENT DOCUMENTS

| 9,152,267 | B2 | 10/2015 | Seo et al. | |
| 9,207,818 | B2* | 12/2015 | Kang | G06F 3/044 |
| 9,329,710 | B2 | 5/2016 | Kim et al. | |
| 9,600,127 | B2* | 3/2017 | Hong | G06F 3/044 |
| 2009/0213090 | A1* | 8/2009 | Mamba | G06F 3/044 345/174 |
| 2009/0315854 | A1* | 12/2009 | Matsuo | G06F 3/0412 345/174 |
| 2010/0007621 | A1* | 1/2010 | Kang | G06F 3/044 345/173 |
| 2010/0045625 | A1* | 2/2010 | Yang | G06F 3/044 345/173 |

(Continued)

FOREIGN PATENT DOCUMENTS

KR 10-2014-0115126 A 9/2014
KR 10-1452042 B1 10/2014

(Continued)

*Primary Examiner* — Nitin Patel
*Assistant Examiner* — Amy Onyekaba
(74) *Attorney, Agent, or Firm* — Innovation Counsel LLP

(57) ABSTRACT

The present disclosure relates to a touch screen which includes: a base substrate including a sensing area and a peripheral area enclosing an edge of the sensing area; a first touch electrode disposed in the sensing area and extending in a first direction; a second touch electrode disposed in the sensing area and extending in a second direction which crosses the first direction; a plurality of sensing lines disposed in the peripheral area, wherein one ends of the sensing lines are respectively connected to the first touch electrode and the second touch electrode; and a pad unit disposed in the peripheral area and connected to the other end of each of the sensing lines to electrically connect the sensing lines to a driving circuit, wherein the sensing lines have different line widths.

18 Claims, 6 Drawing Sheets

(56) References Cited

U.S. PATENT DOCUMENTS

| | | | | |
|---|---|---|---|---|
| 2011/0057887 A1* | 3/2011 | Lin | ....................... | G06F 3/044 |
| | | | | 345/173 |
| 2011/0141038 A1* | 6/2011 | Kuo | ..................... | G06F 3/0412 |
| | | | | 345/173 |
| 2012/0081300 A1* | 4/2012 | Chan | ...................... | G06F 3/044 |
| | | | | 345/173 |
| 2013/0314625 A1* | 11/2013 | Tsai | ...................... | G06F 3/044 |
| | | | | 349/12 |
| 2014/0028939 A1* | 1/2014 | Nakano | ............... | G02F 1/13338 |
| | | | | 349/42 |
| 2014/0139447 A1* | 5/2014 | Kang | ..................... | G06F 3/044 |
| | | | | 345/173 |
| 2014/0253495 A1* | 9/2014 | Kang | ..................... | G06F 3/044 |
| | | | | 345/174 |
| 2014/0285728 A1* | 9/2014 | Lee | ........................ | G06F 3/041 |
| | | | | 349/12 |
| 2014/0347319 A1* | 11/2014 | Lin | ........................ | G06F 3/044 |
| | | | | 345/174 |
| 2015/0084922 A1* | 3/2015 | Park | ...................... | G06F 3/044 |
| | | | | 345/174 |
| 2015/0234520 A1* | 8/2015 | Chen | ...................... | G06F 3/044 |
| | | | | 345/173 |
| 2016/0209952 A1* | 7/2016 | Lin | ........................ | G06F 3/044 |
| 2017/0097703 A1* | 4/2017 | Lee | ........................ | G06F 3/044 |

FOREIGN PATENT DOCUMENTS

| | | |
|---|---|---|
| KR | 10-2015-0033299 A | 4/2015 |
| KR | 10-1663763 B1 | 10/2016 |

\* cited by examiner

TOUCH SCREEN AND DISPLAY DEVICE INCLUDING THE SAME

CROSS-REFERENCE TO RELATED APPLICATION

This application claims priority to and the benefit of Korean Patent Application No. 10-2016-0024370 filed in the Korean Intellectual Property Office on Feb. 29, 2016, the entire contents of which are incorporated herein by reference.

BACKGROUND

1. Field

An exemplary embodiment of the present disclosure relates to a touch screen and a display device including the same.

2. Description of the Related Art

A touch screen is an input device which is able to input a user's command by selecting an instruction displayed on a screen of an image display device by using the hand or an object.

For this, the touch screen is installed on a front surface of the image display device, thereby converting a touch position directly touched by the hand or the object into an electric signal.

Accordingly, an instruction selected from the touch position is received as an input signal.

Generally, to recognize a touch event generated in a display area as an input signal, the touch screen has touch electrodes in the display area displaying an image.

In addition, sensing lines and a pad unit are formed in a non-display area formed in a peripheral portion of the display area, sensing lines being connected to the touch electrodes in a line unit, and a pad unit being used for connection with an external driving circuit.

Meanwhile, electrical characteristics (e.g., a resistance value and a capacitance value) of the touch electrodes in the touch screen may be varied according to a position of the touch electrodes in the display area.

Specifically, since line lengths of sensing lines connected to the touch electrodes adjacent to the pad unit are short, the resistance value and the capacitance value of the sensing lines are relatively low, and since line lengths of sensing lines connected to the touch electrodes far away from the pad unit are long, the resistance value and the capacitance value of sensing lines are relatively high.

Since the electrical characteristic difference between the sensing lines distorts a signal for sensing the touch event, the electrical characteristic difference may inhibit a touch event from being accurately detected.

The above information disclosed in this Background section is only for enhancement of understanding of the background of the invention and therefore it may contain information that does not form the prior art that is already known in this country to a person of ordinary skill in the art.

SUMMARY

An exemplary embodiment of the present disclosure provides a touch screen and a display device including the same capable of improving a touch recognition rate.

A touch screen according to an exemplary embodiment of the present disclosure includes: a base substrate including a sensing area and a peripheral area enclosing an edge of the sensing area; a first touch electrode disposed in the sensing area and extending in a first direction; a second touch electrode disposed in the sensing area and extending in a second direction which crosses the first direction; a plurality of sensing lines disposed in the peripheral area, wherein some of the plurality of sensing lines are each connected at one end to the first touch electrode and some of the plurality of sensing lines are each connected at one end to the second touch electrode; and a pad unit disposed in the peripheral area and connected to an other end of each of plurality of the sensing lines to electrically connect the sensing lines to a driving circuit, wherein the sensing lines have different line widths.

In an exemplary embodiment of the present disclosure, the line widths of the some of the plurality of sensing lines connected to the first touch electrode may be decreased toward the pad unit.

In an exemplary embodiment of the present disclosure, the line widths of the plurality of sensing lines may be decreased toward the pad unit.

In an exemplary embodiment of the present disclosure, the sensing area may be divided into a first area disposed in an upper portion with reference to a center area and a second area disposed in a lower portion with reference to the center area on a plan view.

In an exemplary embodiment of the present disclosure, wherein the first touch electrode is a first touch electrode disposed in the first area and the second touch electrode is a second touch electrode disposed in the second area, and may further include: a first touch electrode disposed in the second area, and a second touch electrode disposed in the second area, wherein: a size of the first touch electrode disposed in the first area may be different from a size of the first touch electrode disposed in the second area and a size of the second touch electrode disposed in the first area may be different from a size of the second touch electrode disposed in the second area.

An exemplary embodiment of the present disclosure further may include a first dummy electrode disposed between the first touch electrode disposed in the first area and the second touch electrode disposed in the first area and a second dummy electrode disposed between the first touch electrode disposed in the second area and the second touch electrode disposed in the second area.

In an exemplary embodiment of the present disclosure, a line width of the first dummy electrode may be larger than a line width of the second dummy electrode.

An exemplary embodiment of the present disclosure may further include a plurality of first touch electrodes in the first area comprising the first touch electrode, a plurality of first touch electrodes in the second area, a first bridge electrode which electrically connects pairs of the plurality of first touch electrodes in the first area and a second bridge electrode which electrically connects pairs of the plurality of first touch electrodes in the second area.

In an exemplary embodiment of the present disclosure, a line width of the second bridge electrode may be larger than a line width of the first bridge electrode.

In an exemplary embodiment of the present disclosure, the second bridge electrode may include a pair of metal patterns.

In an exemplary embodiment of the present disclosure, a thickness of each of the first touch electrode and a thickness of the second touch electrode may be decreased toward the pad unit.

According to an exemplary embodiment of the present disclosure, a display device may include a touch screen and a display panel.

An exemplary embodiment of the present disclosure provides to a touch screen and a display device including the same capable of improving a touch recognition rate by equalizing electric characteristics between a touch electrode far away from a pad unit and a touch electrode adjacent to the pad unit.

DETAILED DESCRIPTION OF THE EMBODIMENTS

Figure 1:
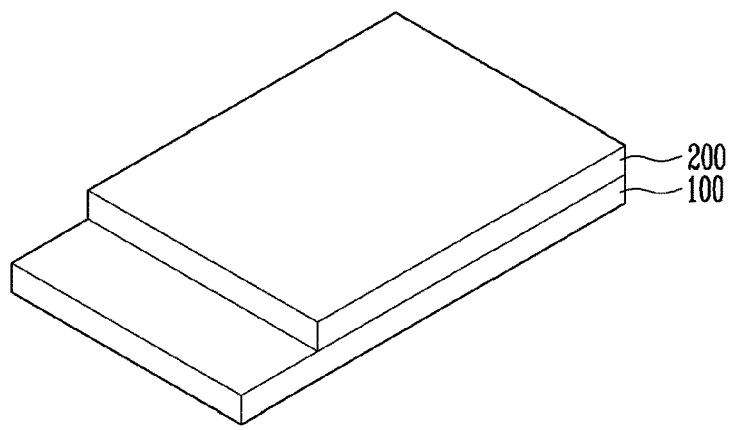
FIG. 1 is a perspective view of a display device according to an exemplary embodiment of the present disclosure.

It will be apparent to those skilled in the art that various modifications and variations can be made in the present disclosure without departing from the spirit or scope of the disclosure, and specific exemplary embodiments are exemplified in the drawings and explained in the detailed description.

Thus, it is intended that the present invention covers the modifications and variations of this invention provided they come within the scope of the present invention and their equivalents.

Like reference numerals designate like elements throughout the specification.

In the accompanying drawings, dimensions of structures are exaggerated for clarity.

The terms, 'first', 'second' and the like may be simply used for description of various constituent elements, but those meanings may not be limited to the restricted meanings.

The above terms are used only for distinguishing one constituent element from other constituent elements.

For example, a first constituent element may be referred to as a second constituent element and similarly, the second constituent element may be referred to as the first constituent element within the scope of the appended claims.

When explaining the singular, unless explicitly described to the contrary, it may be interpreted as the plural meaning.

In the specification, the word "comprise" or "has" is used to specify existence of a feature, a numbers, a process, an operation, a constituent element, a part, or a combination thereof, and it will be understood that existence or additional possibility of one or more other features or numbers, processes, operations, constituent elements, parts, or combinations thereof are not excluded in advance.

In addition, it will be understood that when an element such as a layer, film, region, or substrate is referred to as being "on" another element, it can be directly on the other element or intervening elements may also be present.

In the specification, it will be understood that when an element such as a layer, film, region, or substrate is referred to as being disposed "on" another element, the disposed direction is not limited to an upper direction and include a side direction or a lower direction.

In contrast, it will be understood that when an element such as a layer, film, region, or substrate is referred to as being "beneath" another element, it can be directly beneath the other element or intervening elements may also be present.

Hereinafter, preferably exemplary embodiments of the present invention will be described in further detail with reference to the accompanying drawings.

An exemplary embodiment of the present disclosure relates to a display device which displays an image and is capable of sensing a touch of a user.

A display device according to an exemplary embodiment of the present disclosure senses a touch event through a user' hand, a stylus pen, other input means, and may display or transfer image information depending on the touch event.

Figure 2:
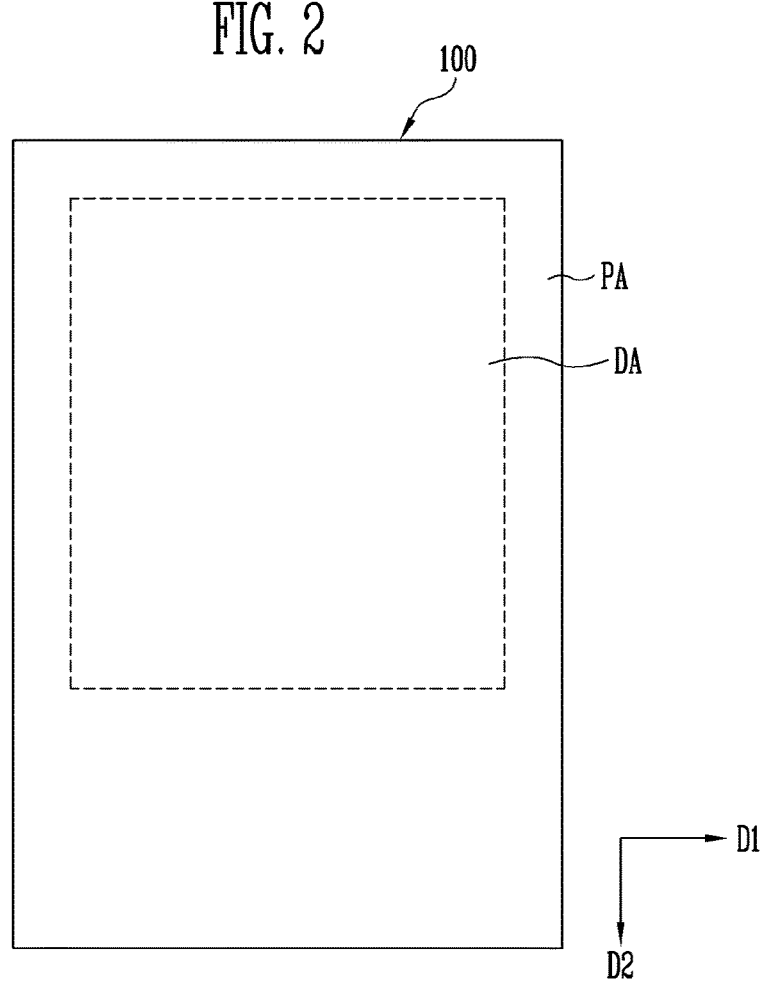
FIG. 2 is a plan view for illustrating a display unit of FIG. 1.
Figure 3:
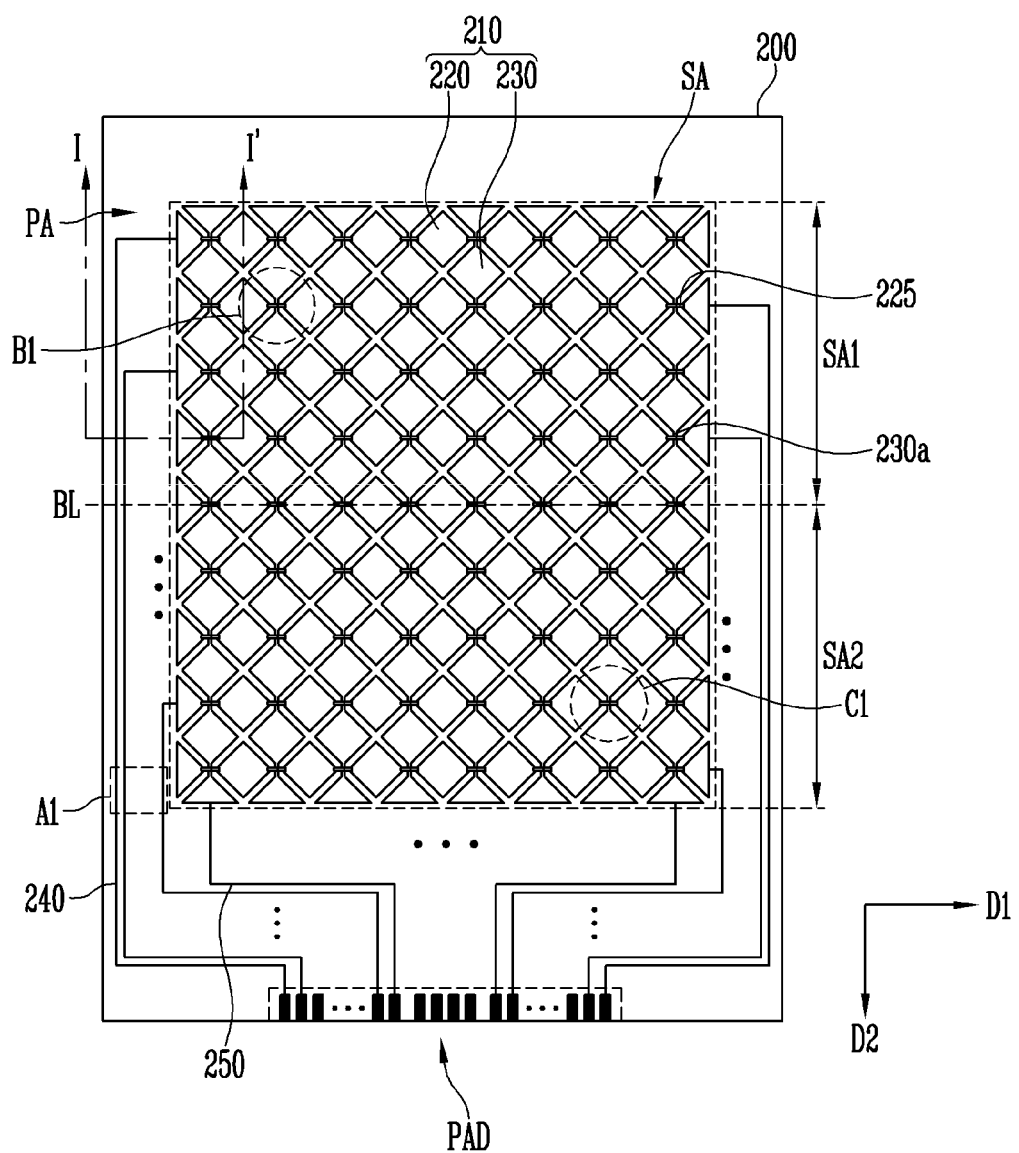
FIG. 3 is a plan view for illustrating a touch unit of FIG. 1.

FIG. 1 is a perspective view of a display device according to an exemplary embodiment of the present disclosure, FIG. 2 is a plan view for illustrating a display unit of FIG. 1, and FIG. 3 is a plan view for illustrating a touch unit of FIG. 1.

Referring to FIGS. 1 to 3, a display device according to an exemplary embodiment of the present disclosure may be provided as various shapes, for example, a rectangular plate shape having two pair of sides parallel with each other.

When the display device is provided as the rectangular plate shape, one pair of sides may be longer than the other pair of sides.

In an exemplary embodiment of the present disclosure, it is described that the shape of the display device is a rectangular shape which has a pair of long sides and a pair of short sides for convenience of description, an extending direction of the short side represents a first direction D1, and an extending direction of the long side represents a second direction D2.

The display device includes a display unit 100 in which display elements (not shown) displaying an image are disposed and a touch unit 200 which recognizes a touch.

The display device includes a display area DA for displaying an image generated from the display unit 100, a sensing area SA for sensing a user's touch and/or a pressure during a touch in the touch unit 200, and a peripheral area PA disposed in at least one side selected from the display area DA and the sensing area SA.

The sensing area SA overlaps the display area DA, and an area of the sensing area SA may be substantially equal to or larger than an area of the display area DA.

The display unit 100 displays arbitrary visual information, for example a text, a video, a photo, 2 dimension or 3 dimension image, etc.

Hereinafter, the arbitrary visual information is indicated as "image".

The kind of the display unit 100 is not particularly limited to a device which displays the image.

The display unit 100 includes the display area DA and peripheral area PA.

The display area DA may include a plurality of pixel areas in which display elements (not shown) are disposed.

The peripheral area PA may represent a non-display area and may be disposed to be adjacent to and/or surrounding the display area DA.

The display unit 100 may include a plurality of signal lines (not shown) and a plurality of thin film transistors (not shown) connected to the plurality of signal lines.

Each of the display elements may be connected to at least one selected from the thin film transistors.

The display elements may include a first electrode connected to the thin film transistor, an emission layer disposed on the first electrode, and a second electrode disposed on the emission layer.

The emission layer may include a light generation layer which generates light by recombining electrons and holes injected from the first electrode and the second electrode.

The touch unit 200 may be disposed on a front surface of the display unit 100, that is, a surface on which an image is displayed, or may be integrally disposed with the display unit 100 inside the display unit 100.

In an exemplary embodiment of the present disclosure, the touch unit 200 disposed on the front surface of the display unit 10 will be described as an example.

The touch unit 200 includes the sensing area SA and the peripheral area PA.

The sensing area SA may correspond to the display area DA of the display unit 100.

The peripheral area PA may be disposed to be adjacent to the sensing area SA. In addition, the peripheral area PA may correspond to the peripheral area PA of the display unit 100.

Here, on a plan view, the sensing area SA may include a first area SA1 and a second area SA2 divided by a virtual reference line BL disposed in a center portion along first direction D1.

The first area SA1 may be disposed in an upper portion with reference to the reference line BL and the second area SA2 may be disposed in a lower portion with reference to the reference line BL.

The touch unit 200 may include a touch sensing unit disposed in the sensing area SA, a line unit disposed in the peripheral area PA, and a pad unit PAD connected to the line unit.

The touch sensing unit recognizes the touch event transferred to the display device through the user' hand or other input means.

In an exemplary embodiment of the present disclosure, the touch sensing unit may be operated by using a mutual capacitance method which senses a variation of a static capacitance due to a mutual operation between two sensing electrodes.

The touch sensing unit includes a touch electrode 210 disposed in the sensing area SA.

The touch electrode 210 includes a first touch electrode 220 extending in a first direction D1 and to which sensing voltage is applied, and a second touch electrode 230 extending in a second direction D2 which crosses the first direction D1.

The first touch electrode 220 is statically coupled with the second touch electrode 230, and a voltage of the first touch electrode 220 is varied due to the static coupling.

The first touch electrode 220 may be made of a plurality of sensing electrode rows connected to each other along the first direction D1 and parallel with each other, and the second touch electrode 230 may be made of a plurality of sensing electrode columns, which cross the plurality of sensing electrode rows, connected to each other along the second direction D2 and parallel with each other.

Here, a material, a shape, and an arrangement configuration of the first touch electrode 220 and the second touch electrode 230 have various modified embodiments based on a touch sensing type of the display device, and an exemplary embodiment of the present disclosure is not limited thereto.

The first touch electrode 220 and the second touch electrode 230 may be made of the same material and may be disposed on the same layer.

At least one sensing electrode selected from the plurality of sensing electrode rows of the first touch electrode 220 and at least one sensing electrode selected from the plurality of sensing electrode columns of the second touch electrode 230 may be formed as independent patterns which are not connected to each other and may be connected to each other through a bridge.

For example, in a case where the plurality of sensing electrode columns are formed to be connected to each other through a connecting portion 230a integrally formed with the sensing electrode rows, the plurality of sensing electrode rows may be separated with each other and may be connected to each other through a separate bridge pattern 225 which functions as a bridge.

The line unit connects the touch sensing unit to a driving circuit (not shown) which drives the touch unit 200.

The driving circuit may be disposed outside of the display device and may include a position detection circuit.

The line unit may transfer a sensing input signal from the driving circuit to the first touch electrode 220 or may transfer a sensing output signal from the second touch electrode 230 to the driving circuit.

The line unit may include a first sensing line 240 connected to the first touch electrode 220 and a second sensing line 250 connected to the second touch electrode 230.

The first sensing line 240 and the second sensing line 250 may be electrically connected to the driving circuit through the pad unit PAD.

Here, as shown in a drawing, the first sensing line 240 may include sensing lines connected to odd-numbered sensing electrode rows of the plurality of sensing electrode rows in a left portion of the peripheral area PA, and sensing lines connected to even-numbered sensing electrode rows in a right portion of the peripheral area PA.

Hereinafter, referring to FIG. 4, the touch unit 200 according to an exemplary embodiment of the present disclosure will be described according to a stacking order.

Figure 4:
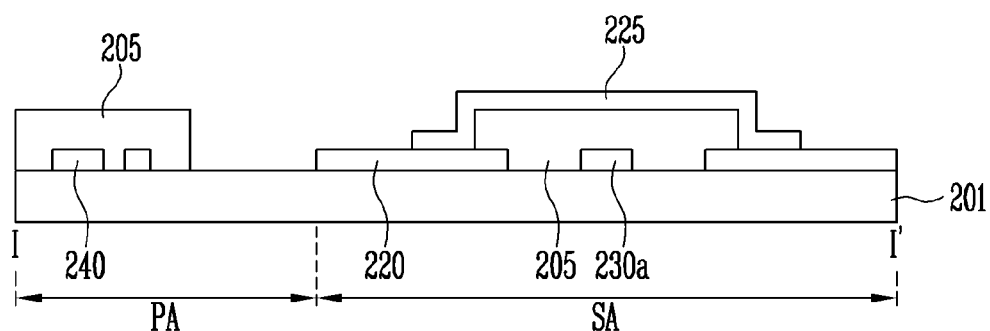
FIG. 4 is a cross-sectional view of FIG. 3 taken along line I-I'.

FIG. 4 is a cross-sectional view of FIG. 3 taken along line I-I'.

Referring to FIGS. 3 and 4, the touch unit 200 includes a base substrate 201 which includes the sensing area SA and the peripheral area PA, the first touch electrode 220 and the first sensing line 240 disposed on the base substrate 201, an insulating layer 205 disposed on the first touch electrode 220 and the first sensing line 240, and a bridge pattern 225 disposed on the insulating layer 205.

The base substrate 201 may be an insulating substrate made of a high molecular organic material and may have flexibility.

A material of insulating substrate including the high molecular organic material may include polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, etc.

However, a material of the base substrate 201 is not limited thereto. For example, the base substrate 201 may be a rigid substrate such as glass or plastics.

The first touch electrode 220 may be disposed on the base substrate 201 and may be made of conductive material.

In an exemplary embodiment of the present disclosure, the first touch electrode 220 may be made of metal or alloy thereof.

The metal may include gold (Au), silver (Ag), aluminum (Al), molybdenum (Mo), chromium (Cr), titanium (Ti), nickel (Ni), neodymium (Nd), copper (Cu), platinum (Pt), etc.

The first touch electrode 220 may be formed of a single layer but is not limited thereto, and the first touch electrode 220 may be formed of multilayer which is stacked with at least 2 materials selected from the abovementioned metals and the alloys.

In an exemplary embodiment of the present disclosure, the first touch electrode 220 may be made of transparent conductive material.

The transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin Oxide ($SnO_2$), carbon nanotube (carbon nanotube), and graphene, etc.

The first touch electrode 220 may be formed of a single layer or a multilayer. In this case, the first touch electrode 220 may include the multilayer which is stacked with at least 2 materials selected from the abovementioned transparent conductive materials.

The first sensing line 240 may be disposed in peripheral area PA of the base substrate 201 and may be disposed on the same layer as the first touch electrode 220.

The first sensing line 240 may be formed of a transparent conductive material or a low resistance metal, or be formed in a structure stacked with a transparent conductive material and a metal.

The insulating layer 205 may include an inorganic insulating layer which includes a single layer including at least one selected from the group consisting of silicon nitride (SiNx), silicon oxide (SiOx), and silicon oxynitride (SiOxNy), or, the inorganic insulating layer may include a stacked layer including at least two selected from the group consisting of silicon nitride (SiNx), silicon oxide (SiOx), and silicon oxynitride (SiOxNy).

The bridge pattern 225 is disposed to cross the connecting portion 230a and is electrically insulated from the connecting portion 230a by the insulating layer 205.

Here, the connecting portion 230a may be made of the same material as the first touch electrode 220.

Figure 5:
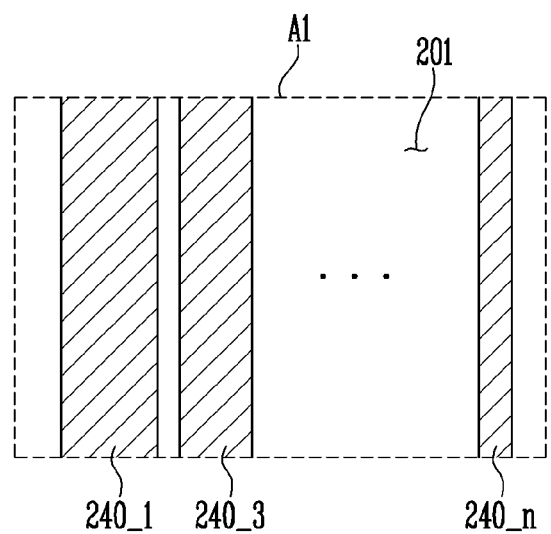
FIG. 5 is an enlarged plan view of an A1 portion of FIG. 3.

FIG. 5 is an enlarged plan view of an A1 portion of FIG. 3.

Referring to FIGS. 3 and 5, the first sensing line 240 may be disposed in the peripheral area PA of the base substrate 201 and may extend from the first touch electrode 220 to the pad unit PAD in the second direction D2 which is a long side direction of the touch unit 200.

The first sensing lines 240 extending from the first touch electrode 220 to the pad unit PAD may have different line widths.

For example, a line width of the first sensing line 240 connected to the first touch electrode 220 adjacent to the pad unit PAD is relatively narrow, and a line width of the first sensing line 240 connected to the first touch electrode 220 far away from the pad unit PAD is relatively wide.

As shown in FIG. 5, the first sensing line 240 include a 1-1 sensing line 240_1, a 1-3 sensing line 240_3, and a 1-n sensing line 240_n connected to an odd-numbered sensing electrode row among a plurality of sensing electrode rows of the first touch electrode 220.

The first sensing electrode row connected to the 1-1 sensing line 240_1 is disposed at the farthest distance from the pad unit PAD, and the n sensing electrode row connected to the 1-n sensing line 240_n is disposed at the closest distance from the pad unit PAD.

Because of this, the 1-1 sensing line 240_1 may be designed to have the widest line width, and the 1-n sensing line 240_n may be designed to have the narrowest line width.

As described above, in a case where the line width of the sensing line is decreased in order of the 1-1 sensing line 240_1, the 1-3 sensing line 240_3, and the 1-n sensing line 240_n, a resistance value (or an RC delay value) of the 1-1 sensing line 240_1 having the widest line width is the lowest level, and a resistance value (or an RC delay) of the 1-n sensing line 240_n having the narrowest line width is the highest level.

Meanwhile, the 1-1 sensing line 240_1 is disposed at the outermost portion of the peripheral area PA, and is connected to the first sensing electrode row disposed at the farthest distance from the pad unit PDA.

Therefore, the line length of the 1-1 sensing line 240_1 is longer than the line length of each of the 1-3 sensing line 240_3 and the 1-n sensing line 240_n.

In general, a resistance value of a line is proportional to a line length and is inversely proportional to a line width.

Therefore, with reference to the resistance value or the RC delay value of the 1-1 sensing line 240_1 having the widest line width and the longest line length, the line width of the 1-3 sensing line 240_3 and the 1-n sensing line 240_n may be determined.

That is, the line width of the 1-3 sensing line 240_3 and the 1-n sensing line 240_n is designed such that a resistance value (or an RC delay value) of the 1-3 sensing line 240_3 and the 1-n sensing line 240_n is equal to that of the 1-1 sensing line 240_1.

Due to this, electrical characteristics (e.g., the resistance value or the RC delay value) among the 1-1 sensing line 240_1, the 1-3 sensing line 240_3, and the 1-n sensing line 240_n may be equal.

As a result, since electric characteristics among the 1-1 sensing line 240_1, the 1-3 sensing line 240_3, and the 1-n sensing line 240_n are equal, a distortion of a signal for sensing a touch event is minimized, thereby accurately detecting the touch event, such that a touch recognition rate of the touch sensing unit may be improved.

The following Table 1 shows values of the sizes of driving signals for sensing the touch event in a touch electrode disposed in the second area SA2 adjacent to the pad unit PAD and a touch electrode disposed in the first area SA1 far away from the pad unit PAD.

TABLE 1

| | Classification | Touch electrode disposed in first area SA1 | Touch electrode disposed in second area SA2 |
|---|---|---|---|
| Driving signal | Experimental group | 52 | 147 |

TABLE 1-continued

| Classification | Touch electrode disposed in first area SA1 | Touch electrode disposed in second area SA2 |
|---|---|---|
| (mV) Exemplary embodiment | 55 | 141 |

An experimental group of Table 1 may be in a case where sensing lines having the same line widths are disposed in the peripheral area PA of the touch unit 200.

An exemplary embodiment of Table 1 may be in a case where sensing lines having the different line widths are disposed in the peripheral area PA of the touch unit 200.

In the experimental group, the driving signal of the touch electrode disposed in the first area SA1 was measured to be 52 mV, and the driving signal of the touch electrode disposed in the second area SA2 was measured to be 147 mV.

In the exemplary embodiment, the driving signal of the touch electrode disposed in the first area SA1 was measured to be 55 mV, and the driving signal of the touch electrode disposed in the second area SA2 was measured to be 141 mV.

As shown in the Table 1, it can be confirmed that the size difference between driving signals respectively provided to the touch electrode 210 in the first area SA1 and the touch electrode 210 in the second area SA2 in an exemplary embodiment including the sensing lines having different line widths is smaller than the size difference in the experimental group including the sensing lines having the same line widths.

In an exemplary embodiment of the present disclosure, a line shape of each of the 1-1 sensing line 240_1, the 1-3 sensing line 240_3, and the 1-n sensing line 240_n may be variously modified if the lines have uniform electrical characteristics, and is not limited to the above structure.

For example, a line width of each of the 1-1 sensing line 240_1, the 1-3 sensing line 240_3, and the 1-n sensing line 240_n may be gradually decreased from first area SA1 to the second area SA2 in the sensing area SA.

In addition, in an exemplary embodiment of the present disclosure, the thickness of each of the first touch electrode 220 and the second touch electrode 230 may be decreased toward the pad unit PAD.

That is, the thickness of each of the first touch electrode 220 and the second touch electrode 230 may be gradually decreased from the first area SA1 to the second area SA2.

For example, the thickness of the first touch electrode 220 disposed in the first area SA1 may be thicker than the thickness of the first touch electrode 220 disposed in the second area SA2, and the thickness of the second touch electrode 230 disposed in the first area SA1 may be also thicker than the thickness of the second touch electrode 230 disposed in the second area SA2.

As described above, in the case where the thickness of the first touch electrode 220 is decreased toward the pad unit PAD, the first touch electrode 220 in the first area SA1, which is relatively thick, has a relatively low resistance value, and the first touch electrode 220 in the second area SA2, which is relatively thin, has a relatively high resistance value.

In addition, in the case where the thickness of the second touch electrode 230 is decreased as toward the pad unit PAD, the second touch electrode 230 in the first area SA1, which is relatively thick, has a relatively low resistance value, and the second touch electrode 230 in the second area SA2, which is relatively thin, has a relatively high resistance value.

Because of this, the resistance value of the touch electrode 210 disposed in the first area SA1 may be different from the resistance value of the touch electrode 210 disposed in the second area SA2.

Meanwhile, each of the touch electrode 210 in the first area SA1 and the touch electrode 210 in the second area SA2 are electrically connected to the first sensing lines 240 having different line lengths.

For example, the line length of the first sensing line 240 connected to the touch electrode 210 in the first area SA1 is longer than the line length of the first sensing line 240 connected to the touch electrode 210 in the second area SA2.

Therefore, the touch electrode 210 in the first area SA1 is connected to the first sensing line 240 having a relatively high resistance value, and the touch electrode 210 in the second area SA2 is connected to the first sensing line 240 with a relatively low resistance value.

The resistance value of the touch electrode 210 in the first area SA1 is lower than that of the touch electrode 210 in the second area SA2, but the touch electrode 210 in the first area SA1 is connected to the first sensing line 240 with a relatively high resistance value.

In addition, the resistance value of the touch electrode 210 in the second area SA2 is higher than that of the touch electrode 210 in the first area SA1, but the touch electrode 210 in the second area SA2 is connected to the first sensing line 240 having a relatively low resistance value.

Due to this, electrical characteristics between the touch electrode 210 disposed in the first area SA1 and the touch electrode 210 disposed in the second area SA2 may be equal.

Figure 6:
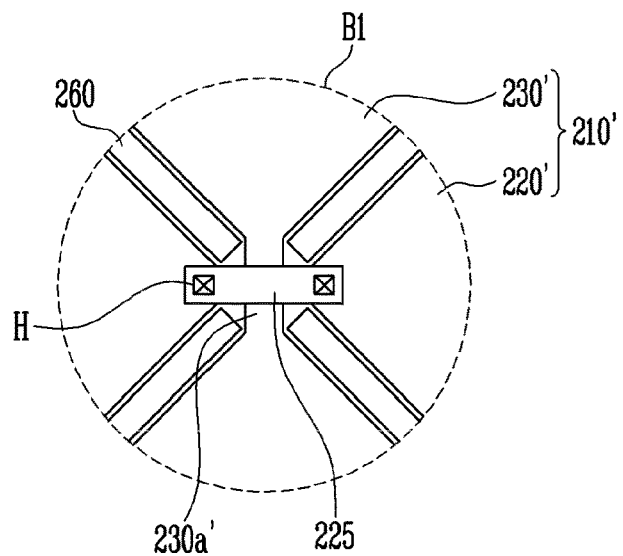
FIG. 6 is an enlarged plan view of a B1 portion disposed in a first area SA1 of FIG. 3.
Figure 7:
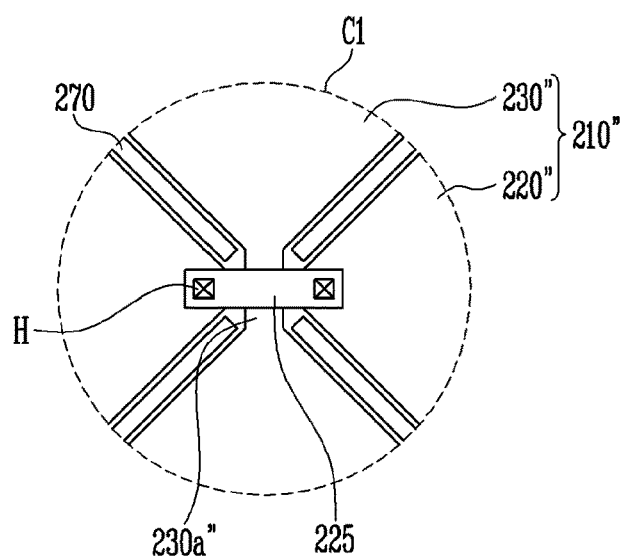
FIG. 7 is an enlarged plan view of a C1 portion disposed in a second area SA2 of FIG. 3.

FIG. 6 is an enlarged plan view of a B1 portion disposed in a first area SA1 of FIG. 3 and FIG. 7 is an enlarged plan view of a C1 portion disposed in a second area SA2 of FIG. 3.

Referring to FIG. 3, FIG. 6, and FIG. 7, a touch electrode 210' is disposed in the first area SA1 disposed in an upper portion of the sensing area SA of the touch unit 200, and a touch electrode 210" is disposed in the second area SA2 disposed in a lower portion of the sensing area SA.

The touch electrode 210' in the first area SA1 includes the first touch electrode 220' extending in the first direction D1 and the second touch electrode 230' extending in the second direction D2 crossing the first direction D1.

The first touch electrode 220' is connected to an adjacent first touch electrode 220' through a bridge pattern 225.

The second touch electrode 230' disposed in the first area SA1 is connected to an adjacent second touch electrode 230' through a connecting portion 230a.

In this case, the bridge pattern 225 is electrically connected to the first touch electrode 220' through a contact hole H.

The touch electrode 210" in the second area SA2 also includes the first touch electrode 220" extending in the first direction D1 and the second touch electrode 230" extending in the second direction D2.

The first touch electrode 220" disposed in the second area SA2 is connected to the adjacent first touch electrode 220" through the bridge pattern 225.

The second touch electrode 230" disposed in the second area SA2 is connected to the adjacent second touch electrode 230" through the connecting portion 230a.

In this case, the bridge pattern 225 is electrically connected to the first touch electrode 220" through contact hole H.

In the first area SA1, a first dummy electrode 260 is disposed in a dummy area which is a space disposed between the first touch electrode 220' and the second touch electrode 230'.

In the second area SA2, a second dummy electrode 270 is disposed in a dummy area which is space disposed between the first touch electrode 220" and the second touch electrode 230".

The first dummy electrode 260 may be a floating electrode electrically separated from the first touch electrode 220' and the second touch electrode 230'.

The first dummy electrode 260 may be provided to minimize a value of a parasitic capacitance generating between the first touch electrode 220' and the second touch electrode 230'.

The second dummy electrode 270 may be also floating electrode electrically separated from the first touch electrode 220" and the second touch electrode 230".

The second dummy electrode 270 may be provided to minimize a value of a parasitic capacitance generating between the first touch electrode 220" and the second touch electrode 230".

The line width of the first dummy pattern 260 may be larger than a line width of the second dummy pattern 270.

Since the line width of the first dummy pattern 260 is larger than the line width of the second dummy pattern 270, a distance between the first touch electrode 220' and the second touch electrode 230' in the first area SA1 may be larger than a distance between the first touch electrode 220" and the second touch electrode 230" in the second area SA2.

Therefore, a parasitic capacitance value of the touch electrode 210' in the first area SA1 may be lower than a parasitic capacitance value of the touch electrode 210" in the second area SA2.

In addition, since the line width of the first dummy pattern 260 is larger than the line width of the second dummy pattern 270, a size of the touch electrode 210' in the first area SA1 may be different from a size of the touch electrode 210" in the second area SA2.

For example, the size of the first touch electrode 220' in the first area SA1 may be smaller than the size of the first touch electrode 220" in the second area SA2, and the size of the second touch electrode 230' in the first area SA1 may be also smaller than the size of the second touch electrode 230" in the second area SA2.

Meanwhile, each of the touch electrodes 210' in the first area SA1 and the touch electrode 210" in the second area SA2 is electrically connected to the first sensing lines 240 having different line lengths.

For example, the line length of the first sensing line 240 connected to the touch electrode 210' in the first area SA1 is longer than the line length of the first sensing line 240 connected to the touch electrode 210" in the second area SA2.

Therefore, the touch electrode 210' in the first area SA1 is connected to the first sensing line 240 having a relatively high resistance value, and the touch electrode 210" in the second area SA2 is connected to the first sensing line 240 with a relatively low resistance value.

A parasitic capacitance value of the touch electrode 210' in the first area SA1 is lower than a parasitic capacitance value of the touch electrode 210" in the second area SA2, but the touch electrode 210' in the first area SA1 is connected to the first sensing line 240 with a relatively high resistance value.

In addition, the parasitic capacitance value of the touch electrode 210" in the second area SA2 is higher than the parasitic capacitance value of the touch electrode 210' in the first area SA1, but the touch electrode 210" in the second area SA2 is connected to the first sensing line 240 with a relatively low resistance value.

Due to this, electrical characteristics between the touch electrode 210' disposed in the first area SA1 and the touch electrode 210" disposed in the second area SA2 may be equal.

As a result, since electrical characteristics between the touch electrode 210' in the first area SA1 far away from the pad unit PAD and the touch electrode 210" in the second area SA2 adjacent to the pad unit PAD equal, a distortion of a signal for sensing a touch event is minimized, thereby accurately detecting the touch event. Due to this, a touch recognition rate of the touch unit 200 may be improved.

The following Table 2 shows a size of driving signal for sensing the touch event in the touch electrode disposed in the first area SA1 and the touch electrode disposed in the second area SA2 as value.

TABLE 2

| | Classification | Touch electrode disposed in first area SA1 | Touch electrode disposed in second area SA2 |
|---|---|---|---|
| Driving signal (mV) | Experimental group | 54 | 146 |
| | Exemplary embodiment | 61 | 138 |

An experimental group of Table 2 may be in a case where the touch electrodes having the same sizes are disposed in the first area SA1 and the second area SA2.

An experimental group of Table 2 may be in a case where the touch electrodes having the different sizes are disposed in the first area SA1 and the second area SA2.

In the experimental group, the driving signal of the touch electrode disposed in the first area SA1 was measured to be 54 mV, and the driving signal of the touch electrode disposed in the second area SA2 was measured to be 146 mV.

In the exemplary embodiment, the driving signal of the touch electrode disposed in the first area SA1 was measured to be 61 mV, and the driving signal of the touch electrode disposed in the second area SA2 was measured to be 138 mV.

As shown in the Table 2, it can be confirmed that the size difference between driving signals respectively provided to the touch electrode 210 in the first area SA1 and the touch electrode 210 in the second area SA2 in an exemplary embodiment including the touch electrodes having different sizes is smaller than the size difference in the experimental group including the touch electrodes having the same sizes.

Figure 8:
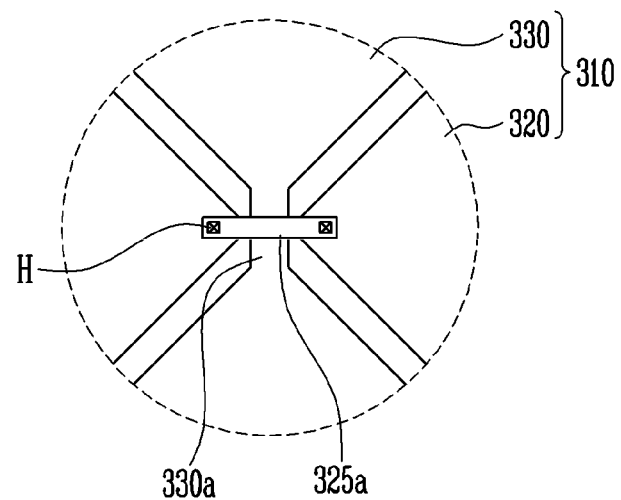
FIG. 8 illustrates a portion of a touch unit according to another exemplary embodiment of the present disclosure and is a plan view corresponding to the B1 portion of the first area SA1 of FIG. 3.
Figure 9:
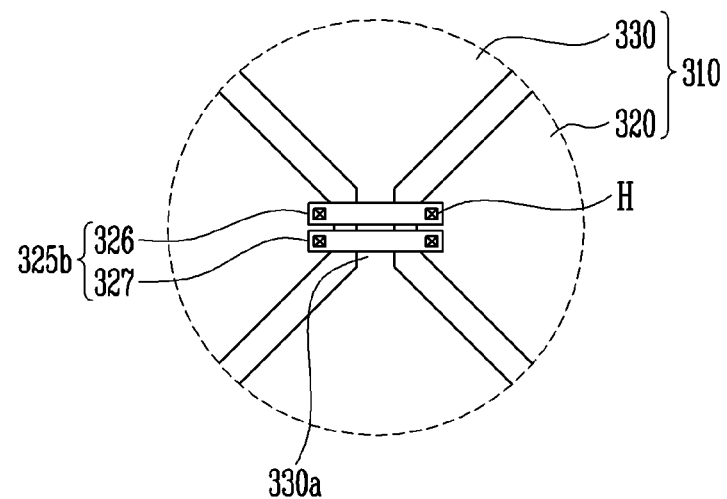
FIG. 9 illustrates a portion of a touch unit according to another exemplary embodiment of the present disclosure and is a plan view corresponding to the C1 portion of the second area SA2 of FIG. 3.

FIG. 8 illustrates a portion of a touch unit according to another exemplary embodiment of the present disclosure and is a plan view corresponding to the B1 portion of the first area SA1 of FIG. 3, and FIG. 9 illustrates a portion of a touch unit according to another exemplary embodiment of the present disclosure and is a plan view corresponding to the C1 portion of the second area SA2 of FIG. 3.

A touch unit according to another exemplary embodiment of the present disclosure will be described based on different parts of the touch unit according to the previous, above exemplary embodiment to avoid an overlapped description.

Parts that are not specifically covered in the another exemplary embodiment of the present disclosure follow the touch unit according to the previous, above exemplary embodiment, and the same reference numerals refer to the same elements and similar reference numerals refer to similar elements.

Referring to FIGS. 3, 8, and 9, a touch unit 200 according to another exemplary embodiment of the present disclosure includes a sensing area SA and a peripheral area PA.

The sensing area SA includes a first area SA1 and a second area SA2 divided by a reference line BL disposed in a center portion.

The first area SA1 is disposed in an upper portion with reference to the reference line (BL) and the second area SA2 is disposed in a lower portion with reference to the reference line (BL).

Touch electrode 310 is disposed in each of the first area SA1 and the second area SA2.

The touch electrode 310 include a first touch electrode 320 extending in a first direction D1 and a second touch electrode 330 extending in a second direction D2 which crosses the first direction D1.

Herein, the first touch electrode 320 disposed in the first area SA1 and the first touch electrode 320 disposed in the second area SA2 may have the same size and may be made of the same material.

In addition, the second touch electrode 330 disposed in the first area SA1 and the second touch electrode 330 disposed in the second area SA2 may have the same size and may be made of the same material.

The second touch electrode 330 disposed in each of the first area SA1 and the second area SA2 is connected to an adjacent second touch electrode 330 through a connecting portion 330a.

The first touch electrode 320 disposed in the first area SA1 is connected to an adjacent first touch electrode 320 through a first bridge pattern 325a.

The first bridge pattern 325a is electrically connected to the first touch electrode 320 through a contact hole H, and is disposed only in a region overlapping the connecting portion 330a.

The first touch electrode 320 disposed in the second area SA2 is connected to an adjacent first touch electrode 320 through a second bridge pattern 325b.

The second bridge pattern 325b is electrically connected to the first touch electrode 320 through a contact hole H.

The second bridge pattern 325b includes a pair of metal patterns 326 and 327 disposed to be spaced apart and parallel to each other and, as far as overlapping with the second touch electrode, the pair of metal patterns 326 and 327 are disposed only in a region overlapping the connecting portion 330a.

The first bridge pattern 325a and the second bridge pattern 325b may be formed of a metallic material with a low resistance value.

The metallic material with the low resistance value may include molybdenum (Mo), silver (Ag), titanium (Ti), copper (Cu), aluminum (Al), molybdenum/aluminum/molybdenum (Mo/Al/Mo), etc.

The first bridge pattern 325a and the second bridge pattern 325b may be made of the same material as the first sensing line 240 and the second sensing line 250 in the peripheral area PA.

In the first area SA1, the first touch electrode 320 is electrically connected to the adjacent first touch electrode 320 through one first bridge pattern 325a, and in the second area SA2, the first touch electrode 320 is electrically connected to the first touch electrode 320 through the second bridge pattern 325b including the pair of metal patterns 326 and 327.

Since the first bridge pattern 325a is made of one metal pattern, a parasitic capacitance value between the first bridge pattern 325a and the adjacent first and second touch electrode 320 and 330 is lower than a parasitic capacitance value between the second bridge pattern 325b made of a pair of metal patterns 326 and 327 and the adjacent first and second touch electrode 320 and 330.

Due to this, a parasitic capacitance value of the touch electrode 310 in the first area SA1 may be lower than a parasitic capacitance value of the touch electrode 310 in the second area SA2.

That is, the parasitic capacitance value of the touch electrode 310 in the first area SA1 may be different from the parasitic capacitance value of the touch electrode 310 in the second area SA2.

Meanwhile, each of the touch electrodes 310 in the first area SA1 and the touch electrode 310 in the second area SA2 is electrically connected to the first sensing lines 240 having different line lengths.

For example, the line length of the first sensing line 240 connected to the touch electrode 310 in the first area SA1 is longer than the line length of the first sensing line 240 connected to the touch electrode 310 in the second area SA2.

Therefore, the touch electrode 310 in the first area SA1 is connected to the first sensing line 240 having a relatively high resistance value, and the touch electrode 310 in the second area SA2 is connected to the first sensing line 240 with a relatively low resistance value.

A parasitic capacitance value of the touch electrode 310 in the first area SA1 is lower than a parasitic capacitance value of the touch electrode 310 in the second area SA2, but the touch electrode 310 in the first area SA1 is connected to the first sensing line 240 with a relatively high resistance value.

In addition, the parasitic capacitance value of the touch electrode 310 in the second area SA2 is higher than the parasitic capacitance value of the touch electrode 310 in the first area SA1, but the touch electrode 310 in the second area SA2 is connected to the first sensing line 240 with a relatively low resistance value.

Due to this, electrical characteristics between the touch electrode 310 disposed in the first area SA1 and the touch electrode 310 disposed in the second area SA2 may be equal.

As a result, since electrical characteristics between the touch electrode 310 in the first area SA1 far away from the pad unit PAD and the touch electrode 310 in the second area SA2 adjacent to the pad unit PAD are equal, a distortion of a signal for sensing a touch event may be minimized, thereby accurately detecting the touch event.

As a result, a touch recognition rate of the touch unit 200 may be improved.

Figure 10:
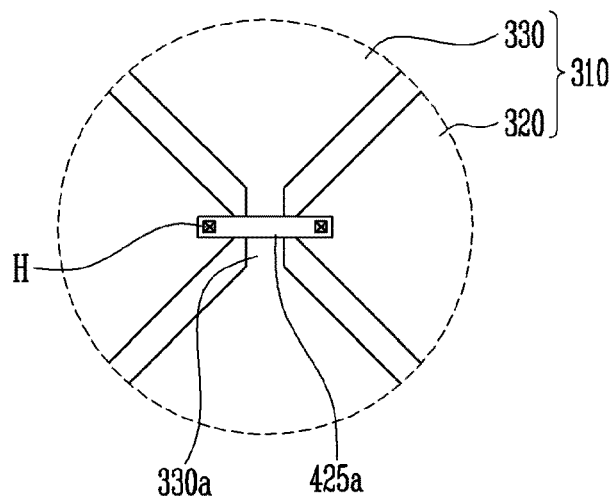
FIG. 10 illustrates a portion of a touch unit according to another exemplary embodiment of the present disclosure and is a plan view corresponding to the B1 portion of the first area SA1 of FIG. 3.
Figure 11:
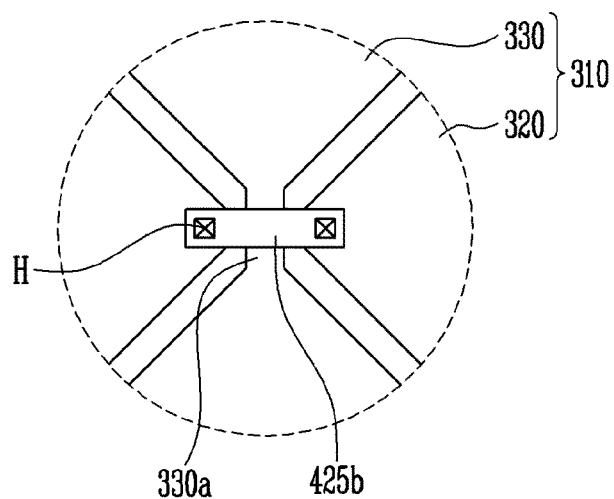
FIG. 11 illustrates a portion of a touch unit according to another exemplary embodiment of the present disclosure and is a plan view corresponding to the C1 portion of the second area SA2 of FIG. 3.

FIG. 10 illustrates a portion of a touch unit according to another exemplary embodiment of the present disclosure and is a plan view corresponding to the B1 portion of the first area SA1 of FIG. 3. FIG. 11 illustrates a portion of a touch unit according to another exemplary embodiment of the present disclosure and is a plan view corresponding to the C1 portion of the second area SA2 of FIG. 3.

A touch unit according to another exemplary embodiment of the present disclosure will be described based on different parts of the touch unit according to the previous, above described exemplary embodiment to avoid an overlapping description.

Parts that are not specifically covered in the another exemplary embodiment of the present disclosure follow the touch unit according to the previous, above described exemplary embodiment, and the same reference numerals refer to the same elements and similar reference numerals refer to similar elements.

Referring to FIGS. 3, 10, and 11, a touch unit 200 according to another exemplary embodiment of the present disclosure includes a sensing area SA and a peripheral area PA.

The sensing area SA includes a first area SA1 and a second area SA2 divided by a reference line BL disposed in a center portion.

Touch electrode 310 is disposed in each of the first area SA1 and the second area SA2.

The touch electrode 310 include a first touch electrode 320 extending in a first direction D1 and a second touch electrode 330 extending in a second direction D2 which crosses the first direction D1.

The second touch electrode 330 disposed in each of the first area SA1 and the second area SA2 is connected to an adjacent second touch electrode 330 through a connecting portion 330a.

The first touch electrode 320 disposed in the first area SA1 is connected to an adjacent first touch electrode 320 through a first bridge pattern 425a.

The first bridge pattern 425a is electrically connected to the first touch electrode 320 through a contact hole H, and is disposed only in a region overlapping the connecting portion 330a.

The first touch electrode 320 disposed in the second area SA2 is connected to an adjacent first touch electrode 320 through a second bridge pattern 425b.

The second bridge pattern 425b is electrically connected to the first touch electrode 320 through a contact hole H.

The first bridge pattern 425a and the second bridge pattern 425b may be formed of a metallic material with a low resistance value.

The metallic material with the low resistance value may include molybdenum (Mo), silver (Ag), titanium (Ti), copper (Cu), aluminum (Al), molybdenum/aluminum/molybdenum (Mo/Al/Mo), etc.

A line width of the second bridge pattern 425b may be larger than a line width of the first bridge pattern 425a.

Since the line width of the second bridge pattern 425b is larger than the line width of the first bridge pattern 425a, a parasitic capacitance value between the second bridge pattern 425b and the adjacent first and second touch electrode 320 and 330 may be higher than a parasitic capacitance value between the first bridge pattern 425a and the adjacent first and second touch electrode 320 and 330.

Therefore, a parasitic capacitance value of the touch electrode 310 in the first area SA1 may be lower than a parasitic capacitance value of the touch electrode 310 in the second area SA2.

That is, the parasitic capacitance value of the touch electrode 310 in the first area SA1 may be different from the parasitic capacitance value of the touch electrode 310 in the second area SA2.

Meanwhile, each of the touch electrodes 310 in the first area SA1 and the touch electrode 310 in the second area SA2 is electrically connected to the first sensing lines 240 having different line lengths.

For example, the line length of the first sensing line 240 connected to the touch electrode 310 in the first area SA1 is longer than the line length of the first sensing line 240 connected to the touch electrode 310 in the second area SA2.

Therefore, the touch electrode 310 in the first area SA1 is connected to the first sensing line 240 having a relatively high resistance value, and the touch electrode 310 in the second area SA2 is connected to the first sensing line 240 with a relatively low resistance value.

A parasitic capacitance value of the touch electrode 310 in the first area SA1 is lower than a parasitic capacitance value of the touch electrode 310 in the second area SA2, but the touch electrode 310 in the first area SA1 is connected to the first sensing line 240 with a relatively high resistance value.

In addition, the parasitic capacitance value of the touch electrode 310 in the second area SA2 is higher than the parasitic capacitance value of the touch electrode 310 in the first area SA1, but the touch electrode 310 in the second area SA2 is connected to the first sensing line 240 with a relatively low resistance value.

Because of this, electrical characteristics between the touch electrode 310 disposed at the first area SA1 and touch electrode 310 disposed at the second area SA2 may be equal.

As a result, since electrical characteristics between the touch electrode 310 in the first area SA1 far away from the pad unit PAD and the touch electrode 310 in the second area SA2 adjacent to the pad unit PAD are equal, a distortion of a signal for sensing a touch event is minimized, thereby accurately detecting the touch event.

As a result, a touch recognition rate of the touch unit 200 may be improved.

It will be understood by those skilled in the art that various changes in form and details may be made therein without departing from the spirit and scope of the disclosure.

Accordingly, the above-described exemplary embodiments should be considered in descriptive sense only and not for purposes of limitation.

The scope of the present disclosure is defined not by the detailed description of the invention but by the appended claims, and all various modifications and equivalent arrangements included within the spirit and scope of the appended claims will be construed as being included in the present disclosure.

What is claimed is:

1. A touch screen comprising:
   a base substrate including a sensing area and a peripheral area enclosing an edge of the sensing area;
   a first touch electrode disposed in the sensing area and extending in a first direction;
   a second touch electrode disposed in the sensing area and extending in a second direction which crosses the first direction;
   a plurality of sensing lines disposed in the peripheral area, wherein some of the plurality of sensing lines are each connected at one end to the first touch electrode and some of the plurality of sensing lines are each connected at one end to the second touch electrode;
   a pad unit disposed in the peripheral area and connected to an other end of each of the plurality of sensing lines to electrically connect the sensing lines to a driving circuit; and
   a dummy electrode disposed between the first touch electrode and the second touch electrode, wherein a line width of the dummy electrode in an area far away from the pad unit is wider than a line width of the dummy electrode in an area close to the pad unit,
   wherein the sensing lines have different line widths.

2. The touch screen of claim 1, wherein:
   line widths of the some of the plurality of sensing lines connected to the first touch electrode are decreased toward the pad unit.

3. The touch screen of claim 1, wherein:
   line widths of the plurality of sensing lines are decreased toward the pad unit.

4. The touch screen of claim 1, wherein:
the sensing area is divided into a first area disposed in an upper portion with reference to a center area and a second area disposed in a lower portion with reference to the center area on a plan view.

5. The touch screen of claim 4, wherein the first touch electrode is a first touch electrode disposed in the first area and the second touch electrode is a second touch electrode disposed in the second area, further comprising:
a first touch electrode disposed in the second area, and
a second touch electrode disposed in the first area,
wherein:
a size of the first touch electrode disposed in the first area is different from a size of the first touch electrode disposed in the second area,
and a size of the second touch electrode disposed in the first area is different from a size of the second touch electrode disposed in the second area.

6. The touch screen of claim 4, further comprising:
a plurality of first touch electrodes in the first area comprising the first touch electrode,
a plurality of first touch electrodes in the second area,
a first bridge electrode which electrically connects pairs of the plurality of first touch electrodes in the first area and a second bridge electrode which electrically connects pairs of the plurality of first touch electrodes in the second area.

7. The touch screen of claim 6, wherein:
a line width of the second bridge electrode is larger than a line width of the first bridge electrode.

8. The touch screen of claim 6, wherein:
the second bridge electrode includes a pair of metal patterns.

9. The touch screen of claim 1, wherein:
a thickness of the first touch electrode and a thickness of the second touch electrode is decreased toward the pad unit.

10. A display device comprising:
a display panel displaying an image; and
a touch screen disposed on a front surface of the display panel,
the touch screen includes
a base substrate including a sensing area and a peripheral area enclosing an edge of the sensing area;
a first touch electrode disposed in the sensing area and extending in a first direction;
a second touch electrode disposed in the sensing area and extending in a second direction which crosses the first direction;
a plurality of sensing lines disposed in the peripheral area, wherein some of the plurality of sensing lines are each connected to the first touch electrode and some of the plurality of sensing lines are each connected at one end to the second touch electrode;
a pad unit disposed in the peripheral area and connected to an other end of each of the plurality of sensing lines to electrically connect the sensing lines to a driving circuit; and
a dummy electrode disposed between the first touch electrode and the second touch electrode, wherein a line width of the dummy electrode in an area far away from the pad unit is wider than a line width of the dummy electrode in an area close to the pad unit,
wherein the sensing lines have different line widths.

11. The display device of claim 10, wherein:
line widths of the some of the plurality sensing lines connected to the first touch electrode are decreased toward the pad unit.

12. The display device of claim 10, wherein:
line widths of the plurality of sensing lines are decreased toward the pad unit.

13. The display device of claim 10, wherein:
the sensing area is divided into a first area disposed in an upper portion with reference to a center area and a second area disposed in a lower portion with reference to the center area on a plan view.

14. The display device of claim 13,
wherein the first touch electrode is a first touch electrode disposed in the first area and the second touch electrode is a second touch electrode disposed in the second area, further comprising:
a first touch electrode disposed in the second area, and
a second touch electrode disposed in the first area.

15. The display device of claim 13, further comprising:
a plurality of first touch electrodes in the first area comprising the first touch electrode,
a plurality of first touch electrodes in the second area,
a first bridge electrode which electrically connects pairs of the first touch electrodes in the first area and a second bridge electrode which electrically connects pairs of the first touch electrodes in the second area.

16. The display device of claim 15, wherein:
a line width of the second bridge electrode is larger than a line width of the first bridge electrode.

17. The display device of claim 15, wherein:
the second bridge electrode in the second area includes a pair of metal patterns.

18. The display device of claim 10, wherein:
a thickness of each of the first touch electrode and the second touch electrode is decreased toward the pad unit.

* * * * *